United States Patent
Huang et al.

(10) Patent No.: US 10,380,150 B2
(45) Date of Patent: Aug. 13, 2019

(54) IDENTIFYING USER EXPECTATIONS IN QUESTION ANSWERING

(71) Applicant: Microsoft Technology Licensing, LLC, Redmond, WA (US)

(72) Inventors: Shen Huang, San Jose, CA (US); Yongzheng Zhang, San Jose, CA (US); Chi-Yi Kuan, Fremont, CA (US); Hu Wang, Mountain View, CA (US); Rui Zhao, Mountain View, CA (US); Zhou Jin, Fremont, CA (US)

(73) Assignee: Microsoft Technology Licensing, LLC, Redmond, WA (US)

(\*) Notice: Subject to any disclaimer, the term of this patent is extended or adjusted under 35 U.S.C. 154(b) by 0 days.

(21) Appl. No.: 15/848,929

(22) Filed: Dec. 20, 2017

(65) Prior Publication Data
US 2019/0188316 A1   Jun. 20, 2019

(51) Int. Cl.
| | | |
|---|---|---|
| G06F 16/332 | (2019.01) | |
| G06Q 50/00 | (2012.01) | |
| G06F 17/27 | (2006.01) | |
| G06K 9/62 | (2006.01) | |

(52) U.S. Cl.
CPC .......... *G06F 16/3329* (2019.01); *G06F 17/27* (2013.01); *G06K 9/6267* (2013.01); *G06Q 50/01* (2013.01)

(58) Field of Classification Search
CPC . G06F 17/30654; G06F 17/27; G06K 9/6267; G06Q 50/01
See application file for complete search history.

(56) References Cited

U.S. PATENT DOCUMENTS

| | | | |
|---|---|---|---|
| 8,275,803 B2 | 9/2012 | Brown et al. | |
| 9,342,608 B2 | 5/2016 | Cook et al. | |
| 2002/0023144 A1* | 2/2002 | Linyard | G06F 9/453 709/218 |
| 2016/0092523 A1* | 3/2016 | Chandrasekaran | G06F 17/3053 707/602 |
| 2017/0169101 A1* | 6/2017 | Walia | G06F 17/30654 |
| 2017/0322939 A1* | 11/2017 | Byron | G06F 17/3053 |
| 2018/0144385 A1* | 5/2018 | Subramanya | G06Q 30/0627 |
| 2018/0218374 A1* | 8/2018 | Shah | G06Q 30/016 |
| 2018/0225365 A1* | 8/2018 | Altaf | G06F 17/30675 |

\* cited by examiner

*Primary Examiner* — Stella L. Woo
(74) *Attorney, Agent, or Firm* — Schwegman Lundberg & Woessner, P.A.

(57) ABSTRACT

Method and system for identifying user expectations in question answering in an on-line social network system are described. The automated support system is configured to address the technical problem of optimization of the processing of user input submitted to a computer in the form of a natural language. The automated support system uses machine learning algorithms to automatically extract, from the user input, information indicative of the user's expectations and obtain data relevant to the input based on said information indicative of the user's expectations.

20 Claims, 4 Drawing Sheets

IDENTIFYING USER EXPECTATIONS IN QUESTION ANSWERING

TECHNICAL FIELD

This application relates to the technical fields of software and/or hardware technology and, in one example embodiment, to machine learning and system and method for automatically identifying user expectations in question answering.

BACKGROUND

Online learning is becoming a more and more important aspect of modern life. One major component of the learning process is interaction in the form of questions and answers. As the question-asking audience can come from any domain as far as the area and the level of expertise, it is often challenging for one specialist to handle all kinds of questions from experts and non-experts alike. Many approaches to automatic question answering systems have been proposed to save human efforts by leveraging historical data. Current solutions of question answering systems usually focus on finding an answer by relevance tuning of a computer-implemented model and asking for user clarification if ambiguity exits. In reality, a person asking a technical question may not always know the best way to describe the problem they are experiencing. They may talk a lot about the situation, while not clearly stating the key point. In that case, too much noise may be involved in the question, which makes existing systems of relevance measuring less effective.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
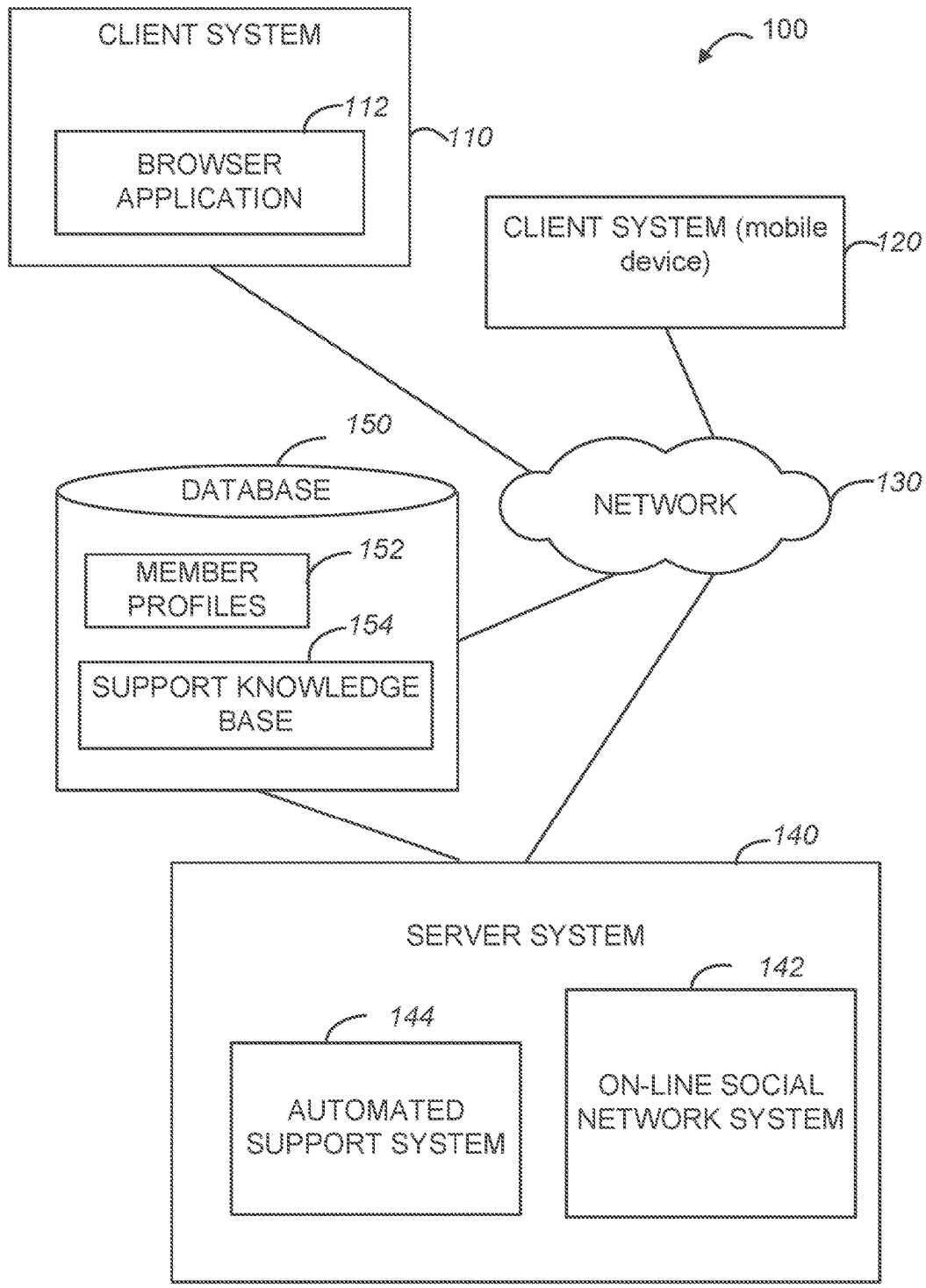
FIG. 1 is a diagrammatic representation of a network environment within which an example method and system for identifying user expectations in question answering may be implemented.

A method and system for identifying user expectations in question answering is described. In the following description, for purposes of explanation, numerous specific details are set forth in order to provide a thorough understanding of an embodiment of the present invention. It will be evident, however, to one skilled in the art that the present invention may be practiced without these specific details. As mentioned above, some existing approaches to identify and process user-submitted question focus on finding an answer by using the submitted questions as is, or by permitting the users themselves to remove any noise information within the question.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, die embodiments are given merely for clarity in disclosure. Thus, any type of server environment, including various system architectures, may employ various embodiments of the application-centric resources system and method described herein and is considered as being within a scope of the present invention.

The technical problem of optimization of the processing of user input submitted to a computer in the form of a natural language is addressed by providing an automated support system enhanced and optimized by machine learning algorithms to automatically extract from the input information indicative of the user's expectations—so called key points of questions.

In some embodiments, the automated support system is provided in the context of an on-line social network system and is configured to leverage data associated with domain experts, which is available within the on-line social network system. For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

An on-line social network may be viewed as a platform to connect people in virtual space, where registered members establish and document networks of people. Each registered member of an on-line social network may be represented by a member profile (also referred to as a profile of a member or simply a profile), which, in turn, may be represented by one or more web pages, a structured representation of the member's information in XML (Extensible Markup Language), JSON (JavaScript Object Notation) or similar format. A member's profile web page of a social networking web site may emphasize employment history and education of the associated member. A member profile may be associated with social links that indicate the member's connection to other members of the social network. A member profile may also include or be associated with comments or recommendations from other members of the on-line social network, with links to other network resources, such as, e.g., publications, etc.

Returning to the automated support system, the methodologies described herein may leverage machine learning techniques in two ways. First, the automated support system may utilize supervised machine learning to detect user expectation in asked questions and, second, it may use unsupervised learning to group questions submitted to the system and then exploit users' professional experience gleaned from data stored in the on-line social network system to select a better user expectation from a given submitted question. The intuition behind the unsupervised learning approach is that in professional social networks different users have different levels of experiences in different domains. The professional users with greater experience submit questions that are more to the point and that contain less noise. For the purposes of this description, user expectation is to be understood as one or more phrases or a sentence that includes an indication of a particular topic that is stored in a support knowledge base as associated with one or more answers.

The supervised machine learning model used to automatically identify user expectation may be in the form of a binary classification model constructed to determine a user expectation based on the question submitted to the automated support system in the form of a natural language. This model—that may be referred to as an expectation extractor model for the purposes of this description—may be trained using previously collected and labeled data samples comprising the submitted questions (full or partial) and the associated answers. The trained model can then take, as input, a question submitted by a user in the form of a natural language and produce, as output, a topic that indicates user expectation. The automated support system uses the resulting topic to retrieve from a support knowledge base an answer corresponding to the topic. The support knowledge base may be provided in a variety of formats that permit associating an item of information with one or more further items of information and allows access to and retrieval of the stored data. The results produced by the automated support system in response to a user-submitted question, as well as any detected interaction of the user with the retrieved answer, can be used as further training data to further optimize and fine-tune the expectation extractor model, thus potentially increasing the efficiency and effectiveness of knowledge sharing, in professional social networks and in other environments where the methodologies described herein are being used.

By way of example, a user may submit to the automated support system a question that contains information that is not useful in its entirety and that may also be misleading. For instance, members may ask a question, such as, this. "Every day I am getting emails about a new connection that I did not invite by myself. Is anyone having this problem? I cannot find anything on how to stop automatically sending/receiving invites. Does anyone have insight or answers for this situation?" Here the user cares more about how to stop automatic sending and receiving of invitations. If all words from the above multi-sentence question are into account, some of the words, such as "email," "connection," "problem." "answers," and "situation" will be misleading to the process of identifying a helpful answer. A classification model—the expectation extractor model utilized by the automated support system—can be trained to detect more accurately what the member really wants.

In one embodiment, the automated support system is configured to split sentences found in the user-submitted question into two types: one is sentences indicative of the situation or context, and the other is indicative of the user's expectation or the recitation of a problem to which the user is seeking an answer. Sentences of the situation type describe the current situation are treated by the automated support system as potentially useful in refining the retrieved answers. On the other hand, sentences of the type expectation are treated as identifying the question topic, effectively indicating what information the user is expecting to receive in response to their question. In the example above, "Every day I am getting email about a new connection that I did not send myself" is of situation type, while "I cannot find anything on how to stop automatically sending/receiving invites" is of expectation type. Accurately detecting a user's expectation with respect to a question submitted by that user may result in improvement in the relevance of results in many different question answering systems. For example, in a search-based question and answer (Q&A) system, the keywords identified as reflecting user expectation could be assigned greater weight, so that a ranking algorithm can mainly consider the user's true requirement. Another application scenario of the methodologies described herein is conversation systems, such as chat bot. Once chat bot determines a user expectation, it can confirm with users as to the accuracy of that determination before giving any answers and thus keep the conversation as effective as possible.

A further aspect of the methodologies described herein is leveraging members' expertise in a professional social network. Unsupervised learning techniques, such as clustering, could be used to group questions with similar user expectations (or the phrased identified as indicative of expectation). The intuition is that the more experienced users in social network will have better understanding of their problem and thus offer clearer description of the associated question. Within each expectation group, greater respective weights can be assigned to the expectation derived from input submitted by more experienced users. This approach may aid less-experienced users to better express what they want and to find better answers.

As mentioned above, the methodology that involves expectation detection to determine a user's need in a natural language based question can be used beneficially in chat bot type systems. This approach can be extended to spelling auto-correction as well. The detected user expectation can be examined to find any typos and offer spelling correction. Example system for identifying user expectations in question answering in an on-line social network system in an on-line social network system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts an automatic support system 144 for identifying user expectations in question answering in an on-line social network system using the methodologies described herein. The automatic support system 144 may be part of or in communication with the on-line social network system 142 and may use information stored in the database 150—the member profiles 152 and a support knowledge base 154. An example automatic support system 144 is illustrated in FIG. 2.

Figure 2:
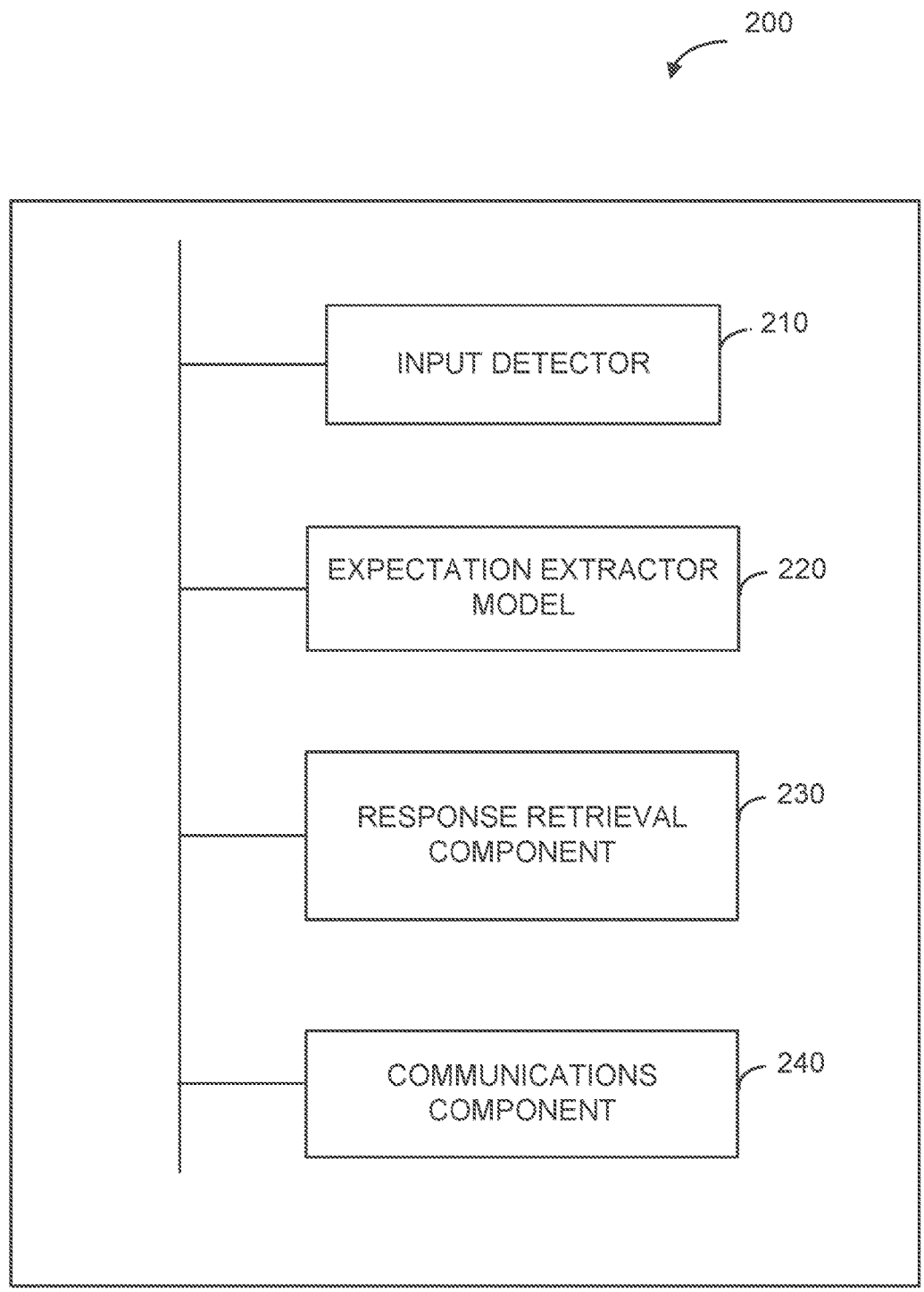
FIG. 2 is block diagram of a system for identifying user expectations in question answering, in accordance with one example embodiment.

FIG. 2 is a block diagram of a system 200 for identifying user expectations in question answering in an on-line social network system, in accordance with one example embodiment. The system 200, in some embodiments, corresponds to the automatic support system 144. As shown in FIG. 2, the system 200 includes an input detector 210, an expectation extractor model 220, a response retrieval component 230, and a communications component 240.

The input detector 210 is configured to detect an input from a user in a form of a natural language. The input may be, e.g., text-based or voice-based.

The expectation extractor model 220 is configured to extract, from the input, a phrase indicative of the user's expectation. The user expectation is to be understood as expressed by one or more phrases or a sentence that includes an indication of a particular topic that is stored as associated with one or more answers in the support knowledge base 154 of FIG. 1. The expectation extractor model 220 is a binary classification model trained using previously collected and labeled training data. In some embodiments, information derived from the input detected by the input detector 210 and the answer retrieved from the support knowledge base 154 in response detecting the input and based on phrase indicative of the user's expectation can be used as training data to train the expectation extractor model. The expectation extractor model 220 may be configured to extract, from the input, a further phrase indicative of a context associated with the user's expectation. The context may be used in accessing the answer corresponding to the user's expectation in the support knowledge base 154.

The response retrieval component 230 is configured to access, in the support knowledge base 154, an answer corresponding to the user's expectation based on the extracted phrase indicative of the user's expectation.

The communications component 240 is configured to communicate the answer to a device associated with the user. In some embodiments, the communications component 240 communicates the answer to the device associated with the user together with a request for further information associated with the input, and/or as an invitation to select from several proposed topics, and/or with an auto-correct suggestion.

In some embodiments, the input detector 210 determines a member profile representing the user in an on-line social network system and determines, based on information stored in the member profile, a level of expertise of the user with respect to a topic associated with the phrase indicative of the user's expectation determined by the expectation extractor model 220. The input detector 210 may also be configured to calculate a weight indicative of the level of expertise of the user with respect to the topic. The input (or information derived from the input) may then be stored as associated with the topic and with the calculated weight. The stored input, together with the associated weight, may be then used as training data to train the expectation extractor model 220. The system 200 may also include a monitor (not shown) to monitor interaction of the user with the answer communicated to the device associated with the user. The monitored information may then used as training data to train the expectation extractor model 220. Some operations performed by the system 200 may be described with reference to FIG. 3.

Figure 3:
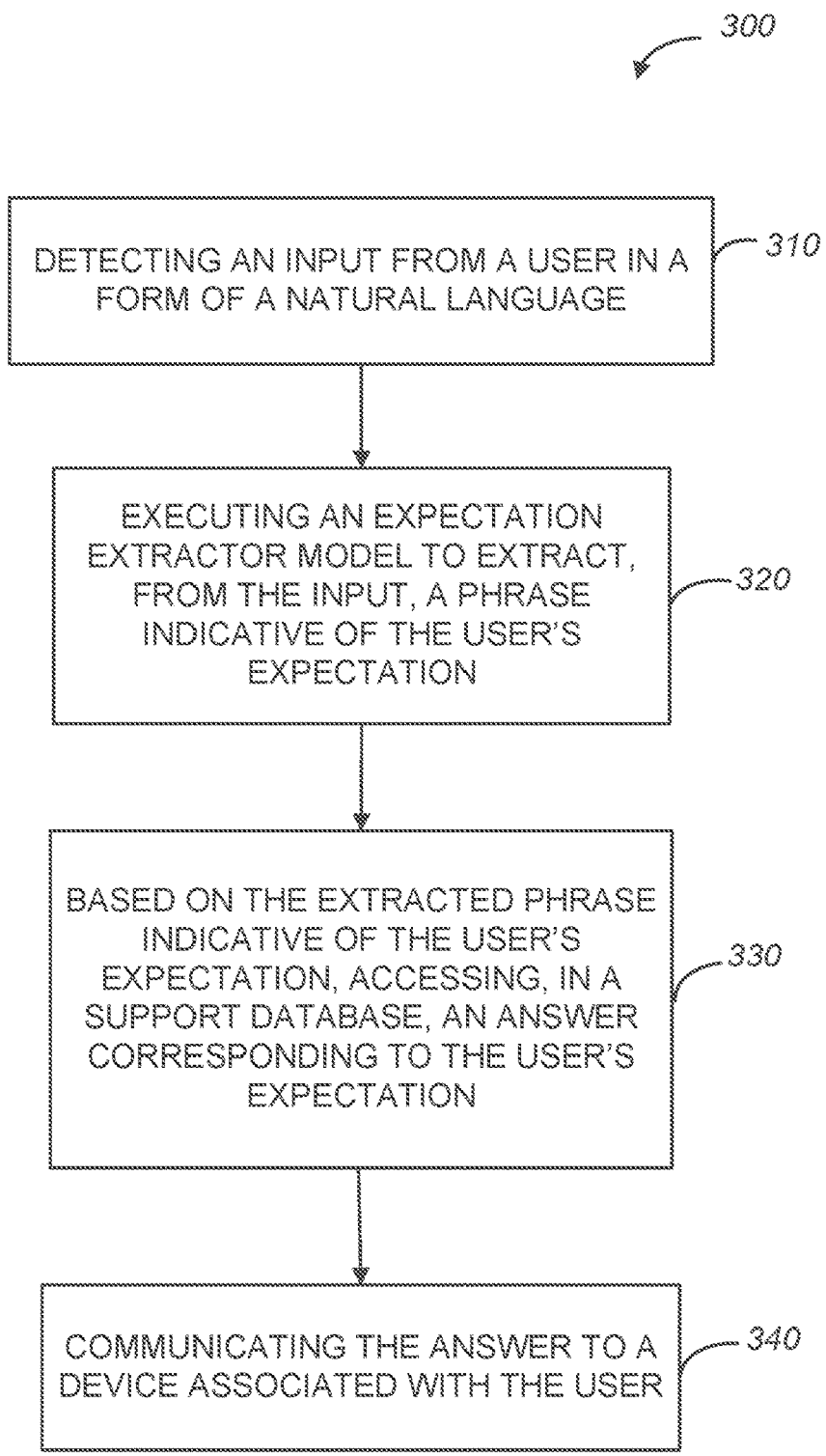
FIG. 3 is a flow chart of a method for identifying user expectations in question answering, in accordance with an example embodiment.

FIG. 3 is a flow chart of a method 300 for identifying user expectations in question answering in an on-line social network system, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the input detector 210 of FIG. 2 detects an input, e.g., text-based or voice-based, from a user, in a form of a natural language. At operation 320, the expectation extractor model 220 of FIG. 2 extracts, from the input, a phrase indicative of the user's expectation. The user expectation is to be understood as expressed by one or more phrases or a sentence that includes an indication of a particular topic that is stored as associated with one or more answers in the support knowledge base 154 of FIG. 1. At operation 330, the response retrieval component 230 of FIG. 2 accesses, in the support knowledge base 154, an answer corresponding to the user's expectation based on the extracted phrase indicative of the user's expectation. The communications component 240 of FIG. 2 communicates the answer to a device associated with the user, at operation 340.

Figure 4:
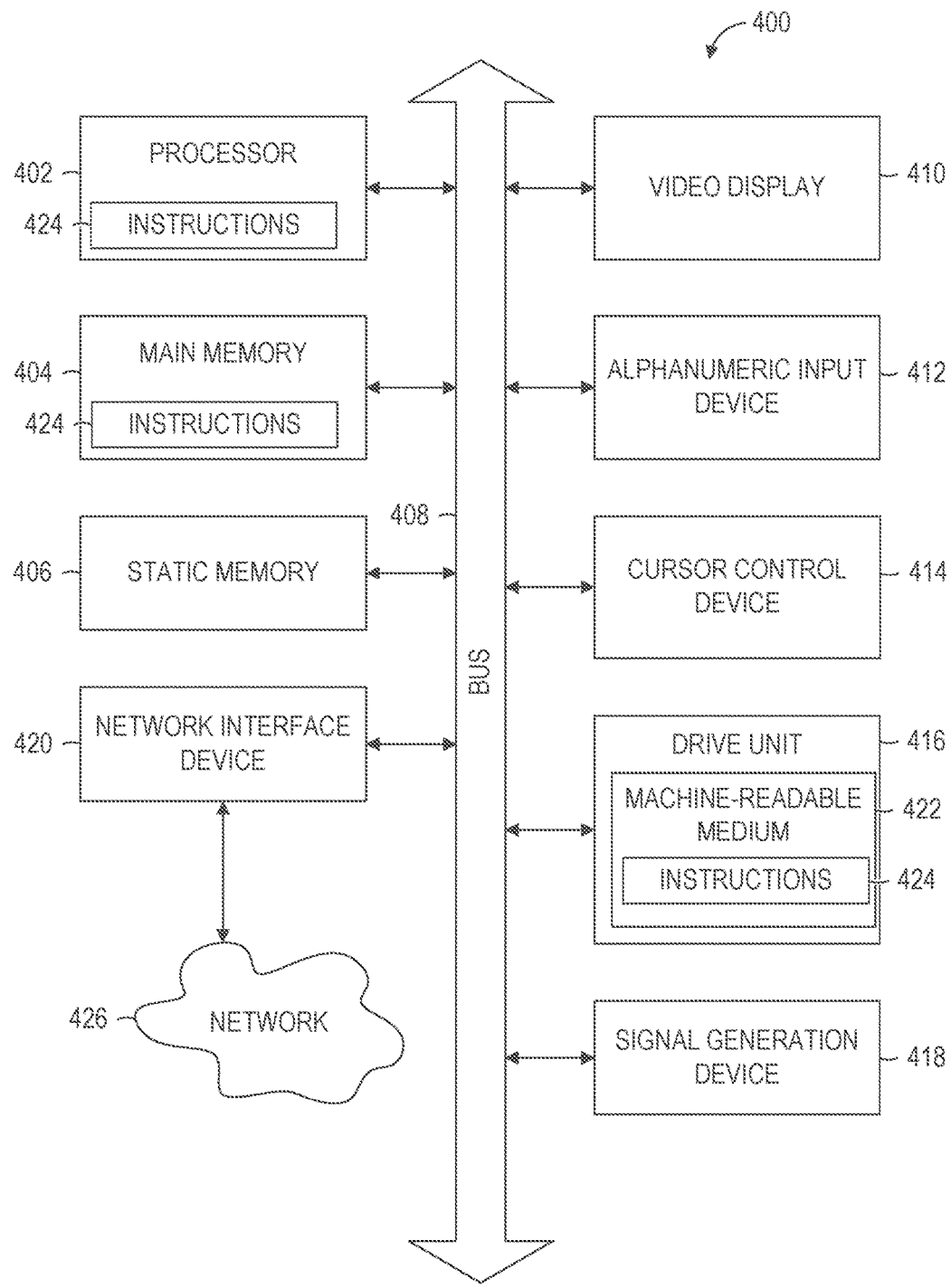
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system for identifying user expectations in question answering in an on-line social network system have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
generating training data by labeling previously collected data samples comprising submitted questions and associated answers;
training a supervised machine learning model using the training data;
using at least one processor, detecting an input from a user in a form of a natural language;
executing the trained supervised machine learning model using the input from the user as input to produce a topic indicative of the user's expectation;
accessing, in a support database, an answer corresponding to the topic; and
communicating the answer to a device associated with the user.

2. The method of claim 1, wherein the expectation extractor model is a binary classification model trained using previously collected and labeled training data.

3. The method of claim 1, comprising using information derived from the input and the answer as training data to train the expectation extractor model.

4. The method of claim 3, comprising:
identifying the input as associated with a topic;
based on information stored in a member profile that represents the user in an on-line social network system, calculating a weight, the weight indicative of a level of expertise of the user with respect to the topic;
storing the input as associated with the topic and with the weight.

5. The method of claim 4, wherein the using of the information derived from the input and the answer as training data to train the expectation extractor model comprises using the weight indicative of a level of expertise of the user with respect to the topic.

6. The method of claim 1, comprising:
executing the expectation extractor model to extract, from the input, a further phrase indicative of a context associated with the user's expectation; and
using the context in accessing; in a support database, of the answer corresponding to the user's expectation.

7. The method of claim 1; comprising monitoring interaction of the user with the answer communicated to the device associated with the user, wherein the using of the information derived from the input and the answer as training data to train the expectation extractor model comprises using the monitored interaction.

8. The method of claim 1, wherein the communicating of the answer to the device associated with the user comprises communication of a request for further information associated with the input.

9. The method of claim 1; wherein the input is in a form of text.

10. The method of claim 1, wherein the input s voice input.

11. A system comprising:
one or more processors; and
a non-transitory computer readable storage medium comprising instructions that when executed by the one or processors cause the one or more processors to perform operations comprising:
generating training data b labeling previously collected data samples comprising submitted questions and associated answers;
training a supervised machine learning model using the training data;
detecting an input from a user in a form of a natural language;
executing the trained supervised machine learning model using the input from the user as input to produce a topic indicative of the user's expectation;
accessing, in a support database, an answer corresponding to the topic; and
communicating the answer to a device associated with the user.

12. The system of claim 11, wherein the expectation extractor model is a binary classification model trained using previously collected and labeled training data.

13. The system of claim 11, comprising using information derived from the input and the answer as training data to train the expectation extractor model.

14. The system of claim 13, comprising:
identifying the input as associated with a topic;
based on information stored in a member profile that represents the user in an on-line social network system, calculating a weight, the weight indicative of a level of expertise of the user with respect to the topic;
storing the input as associated with the topic and with the weight.

15. The system of claim 14, wherein the using of the information derived from the input and the answer as training data to train the expectation extractor model comprises using the weight indicative of a level of expertise of the user with respect to the topic.

16. The system of claim 11, comprising:
executing the expectation extractor model to extract, from the input, a further phrase indicative of a context associated with the user's expectation; and
using the context in accessing, in a support database, of the answer corresponding to the user's expectation.

17. The system of claim 11, comprising monitoring interaction of the user with the answer communicated to the device associated with the user, wherein the using of the information derived from the input and the answer as training data to train the expectation extractor model comprises using the monitored interaction.

18. The system of claim 11, wherein the communicating of the answer to the device associated with the user comprises communication of a request for further information associated with the input.

19. The system of claim 11, wherein the input is in a form of text or is voice input.

20. A machine-readable non-transitory storage medium having instruction data executable by a machine to cause the machine to perform operations comprising:
generating training data by labeling previously collected data samples comprising submitted questions and associated answers;
training a supervised machine learning model using the training data;
detecting an input from a user in a form of a natural language;

executing the trained supervised machine learning model using the input from the user as input to produce a topic indicative of the user's expectation;

accessing, in a support database, an answer corresponding to the topic; and communicating the answer to a device associated with the user.

\* \* \* \* \*

UNITED STATES PATENT AND TRADEMARK OFFICE
CERTIFICATE OF CORRECTION

PATENT NO. : 10,380,150 B2
APPLICATION NO. : 15/848929
DATED : August 13, 2019
INVENTOR(S) : Huang et al.

Page 1 of 1

It is certified that error appears in the above-identified patent and that said Letters Patent is hereby corrected as shown below:

In the Claims

In Column 9, Line 50, in Claim 6, delete "accessing;" and insert --accessing,-- therefor In Column 9, Line 52, in Claim 7, delete "claim 1;" and insert --claim 1,-- therefor In Column 9, Line 62, in Claim 9, delete "claim 1;" and insert --claim 1,-- therefor In Column 9, Line 64, in Claim 10, delete "s" and insert --is-- therefor In Column 10, Line 5, in Claim 11, delete "b" and insert --by-- therefor Signed and Sealed this
Twenty-fourth Day of March, 2020

Andrei Iancu
*Director of the United States Patent and Trademark Office*